United States Patent [19]

Dishner et al.

[11] Patent Number: 4,835,448
[45] Date of Patent: May 30, 1989

[54] BRUSHLESS DC MOTOR TORQUE CONTROL

[75] Inventors: Bryan W. Dishner, Roscoe; P. John Dhyanchand, Rockford, both of Ill.

[73] Assignee: Sundstrand Corporation, Rockford, Ill.

[21] Appl. No.: 138,204

[22] Filed: Dec. 28, 1987

[51] Int. Cl.⁴ .............................................. H02P 6/02
[52] U.S. Cl. .................................... 318/254; 318/138; 318/439
[58] Field of Search ........................ 318/138, 254, 439

[56] References Cited

U.S. PATENT DOCUMENTS

| | | | |
|---|---|---|---|
| 3,908,130 | 9/1975 | Lafuze | 318/430 X |
| 4,295,085 | 10/1981 | Lafuze | 318/254 X |
| 4,320,330 | 3/1982 | Bahr et al. | 318/254 X |
| 4,546,293 | 10/1985 | Peterson et al. | 318/254 |
| 4,561,068 | 3/1986 | Meshkat-Razavi | 318/439 X |
| 4,608,527 | 8/1986 | Glennon et al. | 318/685 |
| 4,638,224 | 1/1987 | Gritter | 318/139 X |
| 4,751,438 | 6/1988 | Markunas | 318/254 |

*Primary Examiner*—Bentsu Ro
*Attorney, Agent, or Firm*—Wood, Dalton, Phillips, Mason & Rowe

[57] ABSTRACT

A control operates a permanent magnet brushless DC motor utilizing a phase advance signal to control motor torque. Input signals to the motor comprise a phase advance command signal and rotor position signals. The control provides switching signals to drive an inverter switch circuit to energize the motor. A start circuit is responsive to an analog rotor position signal and develops switching signals according to a preselected pattern stored in a memory. A run circuit compares a periodic sawtooth signal representing motor speed and a maximum desired phase advance, to a phase advance command signal to develop switching signals. The control switches from the start circuit to the run circuit at a preselected speed.

17 Claims, 4 Drawing Sheets

BRUSHLESS DC MOTOR TORQUE CONTROL

FIELD OF THE INVENTION

This invention relates to a torque control for a brushless DC motor, which may, for example, be used in continuous operation over a range of speeds.

BACKGROUND OF THE INVENTION

Brush-type DC motors have inherent design difficulties which limit the life span and reliability of the motor. Among the difficulties are brush wear, brush arcing, acoustic noise due to brush contact and rotor heat dissipation. Because of these problems with brush-type DC motors, permanent magnet brushless DC motors have been finding wide acceptance in various applications such as tape and disk drives, and aircraft and missle electromechanical actuators. Such motors have a permanent magnet rotor, typically a high coercive force material as samarium cobalt, and a stator with a multiphase coil. An inverter circuit with pairs of complementary conducting switches converts DC to AC to excite the stator coils and operate the motor.

While eliminating the problems of brush-type DC motors, the brushless DC motor presents problems of its own. The impedance of a permanent magnet brushless DC motor is resistive at low rotational speeds and becomes increasingly reactive at higher speeds. This condition leads a shift in the displacement between the rotor and stator magnetic fields with speed change, reducing motor torque. The shift, if uncorrected, impairs motor performance.

Peterson et al. U.S. Pat. No. 4,546,293 discloses such a DC motor and inverter, particularly suited for start-stop operation as in an actuator drive. The Peterson inverter controls motor torque by pulse width modulation (PWM) of the inverter. At speeds above 45% of rated speed, the phase of excitation as advanced to increase and speed range of the motor. At speeds below 45% of rated speed, the phase of excitation is not advanced. Peterson advances phase by comparing a speed related analog signal with a ramp, the slope of which is controlled by an integrator circuit.

SUMMARY OF THE INVENTION

It is a feature of the present invention to control motor torque by advancing the phase of the motor excitation in accordance with a phase command signal. More particularly, the phase command signal is compared with a sawtooth signal having a ramp portion with a starting point which corresponds with the maximum desired phase advance.

Another feature of the invention is that the ramp has a slope corresponding to rotor speed and which is established by connecting with the circuit which generates the ramp, an analog signal which is a function of rotor speed.

Another feature of the invention is a start circuit in which the inverter switches are controlled by switching pattern signals selected in accordance with the position of the rotor of the motor.

Yet another feature is that the motor control has a brake mode with means responsive to a minimum phase advance command to actuate selected switches to brake the motor.

Further features and advantages of the invention will readily be apparent from the specification and from the drawings.

DESCRIPTION OF THE PREFERRED EMBODIMENT

Figure 1:
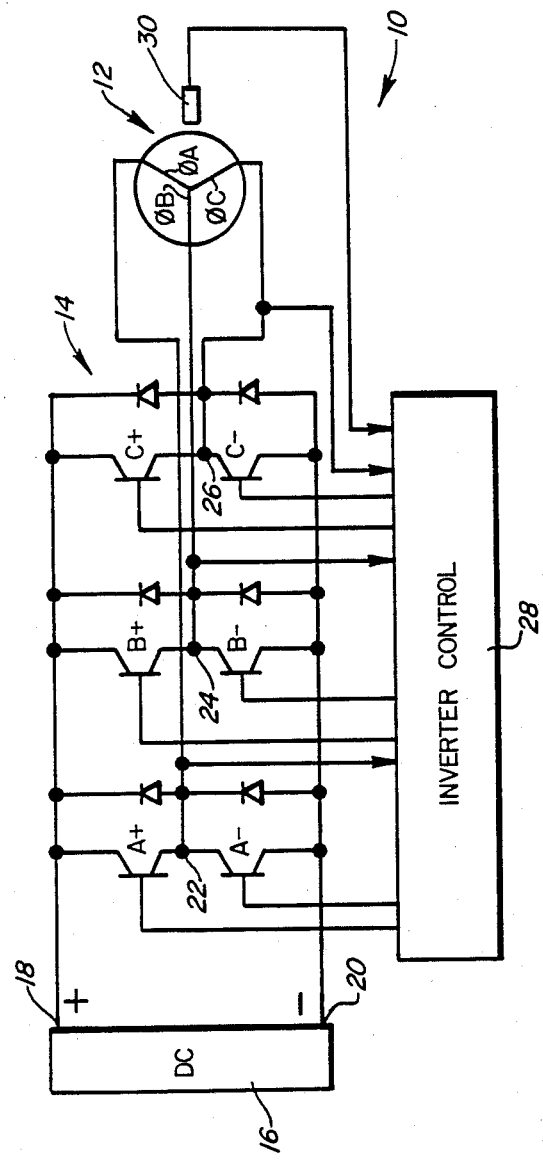
FIG. 1 is a schematic diagram of a brushless DC motor control according to the present invention.

Referring to FIG. 1, there is illustrated a schematic diagram of a motor control 10 according to the present invention for controlling a permanent magnet DC motor 12. The motor 12 includes a permanent magnet rotor (not shown) and a stator having stator coil windings $\Phi A$, $\Phi B$, $\Phi C$.

An inverter 14 includes pairs of complementary conducting switches, as transistors, A+ and A−, B+ and B−, and C+ and C−, coupled across a source of DC voltage represented by a block 16 which generates a DC voltage across + and − terminals 18 and 20, respectively.

The pairs of complementary conducting switches are coupled in series between the terminals 18 and 20. A junction 22 between the A+ and A− switches is coupled to the motor $\Phi A$ winding. Similarly, a junction 24 between the B+ and B− switches is coupled the $\phi B$ winding, and a junction 26 between the C+ and C− switches is coupled to $\Phi C$ winding of the motor 12. The inverter switches A+, A−, B+, B−, C+ and C− are driven by an inverter control 28, as is described more specifically below.

Figure 2:
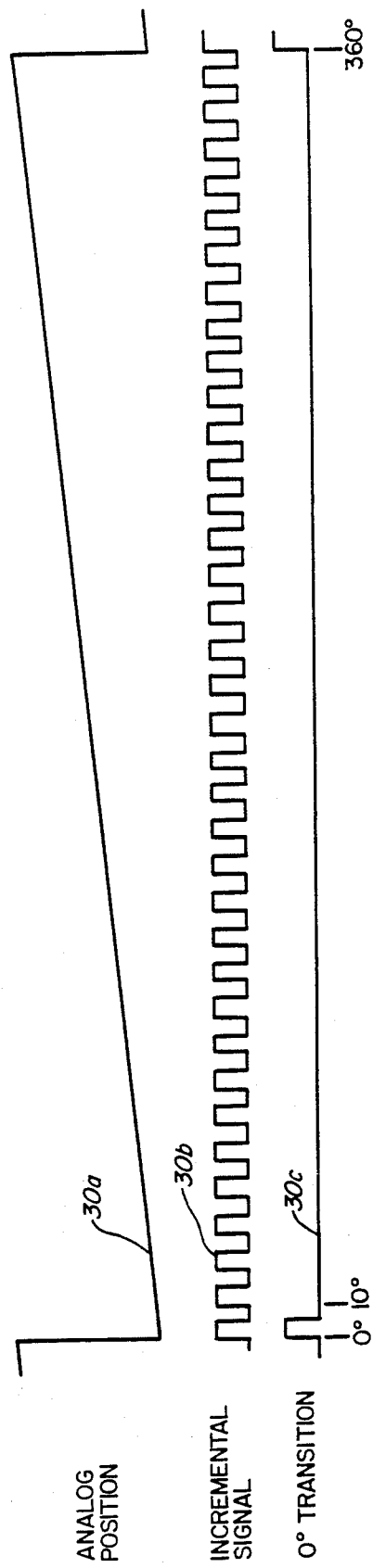
FIG. 2 is an illustration of the curves representing the signals generated by a rotor position sensor of FIG. 1.

A rotor position sensor 30 generates three separate position signals on a line 32 coupled to the inverter control 28. The rotor position sensor 30 is as described in Vaidya et al. U.S. patent application, Ser. No. 941,850, filed Dec. 15, 1986, owned by the assignee of the present invention, the disclosure of which is hereby incorporated by reference. With reference also to FIG. 2, the rotor position sensor 30 generates three separate output signals. Particularly, sensor 30 generates an analog position signal, represented by curve 30a, which is proportional to angular displacement of the rotor from the mechanical zero degree position. The sensor 30 also generates an incremental positional signal, represented by curve 30b, comprising a pulse train, each pulse representing an increment of rotary movement. In the preferred embodiment, the increment represents 10 mechanical degrees. Lastly, the sensor generates a transition signal, represented by curve 30c, which provides a single pulse which occurs each time the rotor passes the mechanical zero degree position.

Figure 3:
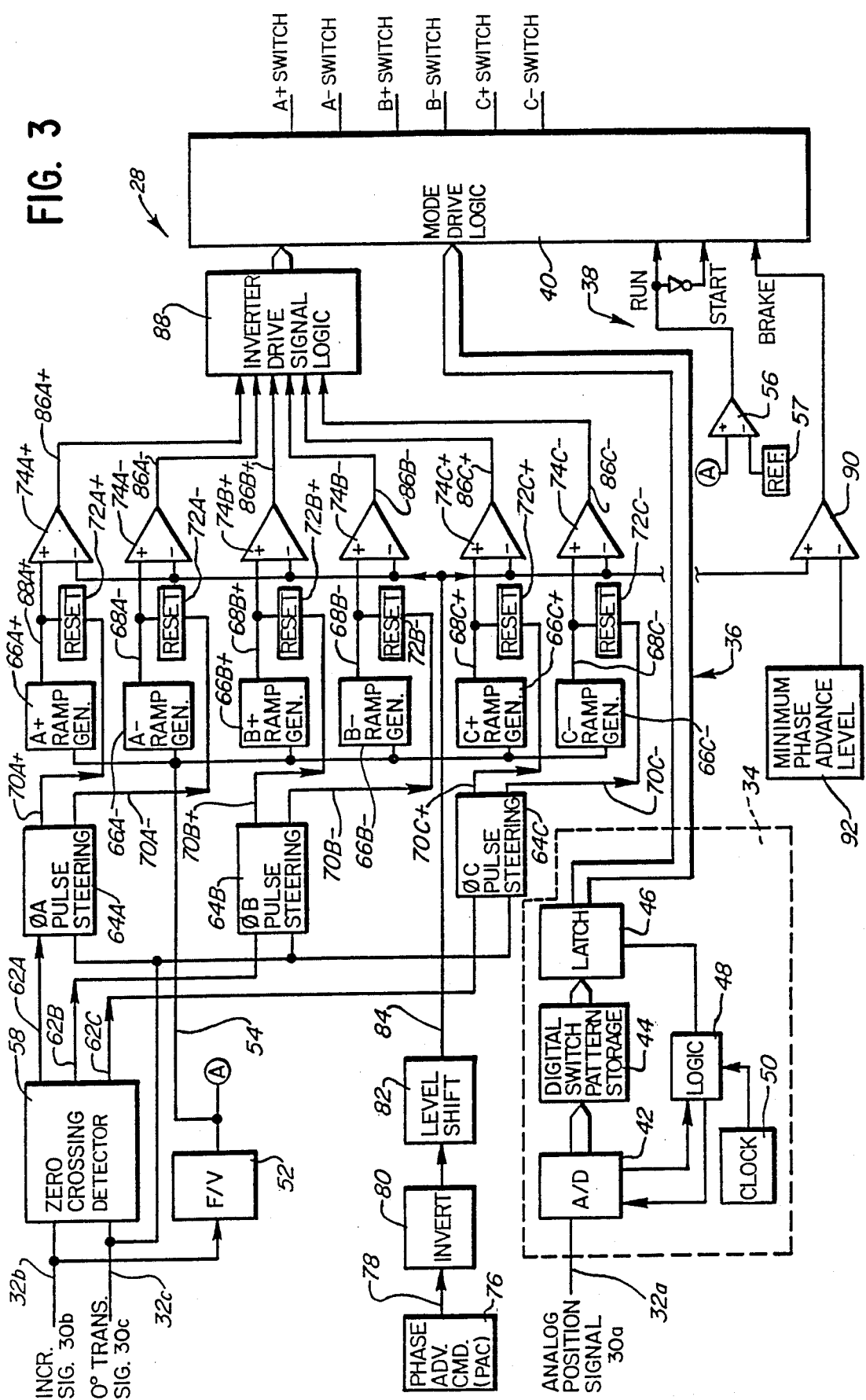
FIG. 3 is a generalized block diagram of an invertor control according to the present invention.

With reference to FIG. 3, a block diagram illustrates the inverter control 28 in greater detail. The inverter control 28 includes a start circuit 34, a run circuit 36, a mode selection circuit 38, and a mode drive logic circuit block 40. The run and start circuits 34 and 36, respectively, provide logic signals to the mode drive logic block 40 which selectively controls the switches in accordance with the mode selection circuit 38.

The incremental position signal represented by the curve 30b does not indicate absolute position of the rotor. Therefore, the absolute position signal represented by the curve 30a is used to start the motor. The start circuit 34 includes an A/D converter 42 which receives the analog position signal on a line 32a and converts the analog position value to a digital value. The A/D converter 42 is coupled to a digital switch pattern storage block 44, which is an EPROM. The pattern block 44 is in turn coupled to a latch block 46 which stores the selected pattern until the pattern is updated by a logic block 48, coupled to the A/D converter 42 and the latch block 46, according to a clock signal provided by a clock 50.

The start circuit 34 is utilized only with lower rotational speeds of the motor because the A/D conversion cycle time is not fast enough to effectively control the motor at higher speeds.

The incremental signal 30b is coupled via a line 32b to a frequency to voltage converter block 52 generating a signal on a line 54 representing motor speed. The speed signal on the line 54 is coupled to the noninverting input of a comparator 56. The inverting input of the comparator 56 receives a reference signal from a block 57 representing a preselected minimum normal operating speed. If the rotor speed exceeds the reference speed, then the mode selection circuit 38 switches the Mode Drive Logic Circuit 40 from the start mode to the run mode.

The run circuit 36 includes a zero crossing detector block 58 which receives the incremental signal 30b on line 32b and the zero transition signal 30c on line 32c. The zero crossing detector 58 generates output signals on lines 62A, 62B, and 62C representing the time at which the rotor position corresponds to the preselected maximum commutation angle for each motor winding ΦA, ΦB, and ΦC, respectively. The lines 62A, 62B and 62C are coupled to ΦA, ΦB, and ΦC pulse steering blocks, 64A, 64B and 64C, respectively. Also coupled to each pulse steering block 64A-C, is the zero transition signal on the line 32c.

A ramp generator block 66 is provided for each inverter switch. (In order to simplify the description herein, a suffix representing a particular switch, e.g. A+ or A−, as shown in the drawing, is not referred to herein as the control for each switch is identical.) Each of the ramp generators 66 receives the speed signal on the line 54 and generates a ramp signal on a line 68 having a slope corresponding to rotor speed.

Figure 4:
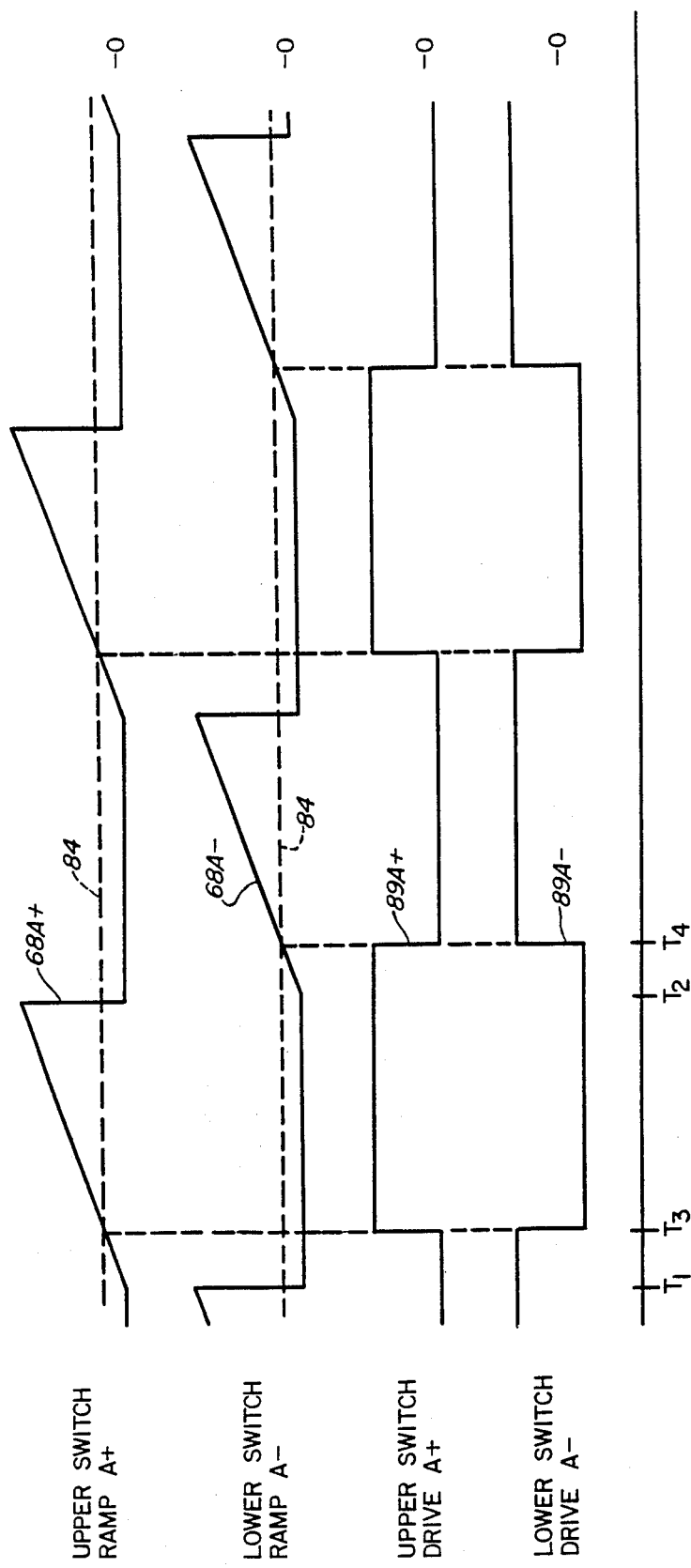
FIG. 4 is a series of wave forms produced by the present invention to control motor torque.

Each pulse steering block 64A-C develops a discrete output signal on a line 70 which is coupled to a reset block 72. Each reset block 72 has an output coupled to the line 68 from its associated ramp generator block 66. The pulse steering block 64 is operable to reset and hold or to release the generated ramp signal from the block 66 to provide a periodic sawtooth, or resettable ramp, signal for each switch synchronized with the rotor position, as described below in connection with FIG. 5. The resettable ramp signals in the lines 68 are coupled to the noninverting input of comparators, or amplifiers 74. Referring also to FIG. 4, curves 68A+ and 68A− representing the resettable ramp signals for upper and lower switches, A+ and A−, are illustrated.

Referring to the upper switch ramp signal 68A+ at time $T_1$ the ΦA pulse steering block 64A releases the ramp signal generated by A+ ramp generator block 66A+, and resets and holds the ramp signal generated by the A− generator ramp 66A−. The time $T_1$ corresponds to a mechanical position of the rotor representing the zero electrical degree position for ΦA advanced by the preselected maximum desired phase advance, determined by the physical position of the sensor 30 in relation to the PMM rotor. The upper switch ramp increases at a rate determined by the voltage on line 54 representing rotor speed until time $T_2$, when the ΦA pulse steering block 64A resets and holds the upper switch ramp 68A+ and releases the lower switch ramp 68A−. The time between $T_1$ and $T_2$ represents 180 electrical degrees of rotation of the rotor. The resettable ramp signals for the ΦB and ΦC switches are similar to that as described for the ΦA switches, except for each being offset 120 electrical degrees.

A phase advance command block 76 develops a phase advance command signal on a line 78. The phase advance command signal represents a desired phase advance required in order to control motor torque. The phase advance command signal may be developed responsive to the difference between actual rotor speed and and a desired rotor speed. Alternatively, the phase advance control signal may be developed in accordance with a mathematical model of motor operation as described in co-pending Markunas patent application Ser. No. 810,845, filed Dec. 18, 1985, assigned to the assignee of this application.

As a nonlinear relationship exists beween torque and phase advance, or commutation angle, it may be desirable to include a gain and compensation function with the block 76 for such a phase advance command signal to achieve an optimum torque-speed relationship, for example.

The phase advance command signal on the line 78 is coupled to an invert block 80 which is in turn coupled to a level shift block 82. The level shift block 82 develops a conditioned phase advance command signal on a line 84 which is coupled to an inverting input of each comparator 74. The conditioned phase advance command signal on the line 84 decreases when the phase advance command signal increases, and conversely increases when the phase advance command decreases.

The conditioned phase advance command signal on the line 84 is represented by the dashed line in FIG. 4. The conditioned signal on the line 84 varies over a range corresponding to the upper and lower limits of the ramp portion of the resettable ramp signals 68. Each comparator 74 compares its resettable ramp signal on the line 68 to the conditioned phase advance command signal on the line 84 and develops a drive signal on a line 86. The comparator 74 develops a high output control signal when the level of the ramp signal on the line 68 exceeds the level of the conditioned phase advance command signal on the line 84. An inverter drive signal logic block 88 receives the control signals from comparators 74 and generates drive signals 89, FIG. 4. The drive signals from logic block 88 are coupled to the mode drive logic block 40.

Referring particularly to FIG. 4, when the upper switch ramp signal 68A+ exceeds the conditioned phase advance command signal at time T3, the upper switch control comparator 74A+ output goes high providing a control signal to logic block 88, generating drive signal 89a+. Simultaneously, the inverter drive signal logic block 88 causes the lower switch drive signal 89A− to go low thereby turning switch A+ on and switch A− off. Subsequently, at time T4 the lower switch ramp signal 68A− exceeds the conditioned phase advance command signal and the lower switch control comparator 74A− output goes high. Lower switch drive signal 89A− goes high and upper switch drive signal 89A+ goes low, turning the A− switch on and the A+ switch off. The inverter drive signal logic block 88 includes appropriate circuitry to prevent complementary switches from eing energized simultaneously, as is known in the art.

With the inverter controller 28 of the present invention, an increase in the desired phase advance command signal causes the level of the conditioned command signal, line 84, to decrease. Therefore, the resettable ramp signal crosses the conditioned phase advance command signal sooner, resulting in the switch control signal being advanced in time. Conversely, a decrease in the phase advance command signal causes an increase in the level of the conditioned phase advance command signal resulting in the switch control signal retreating in time to provide less phase advance.

Figure 5:
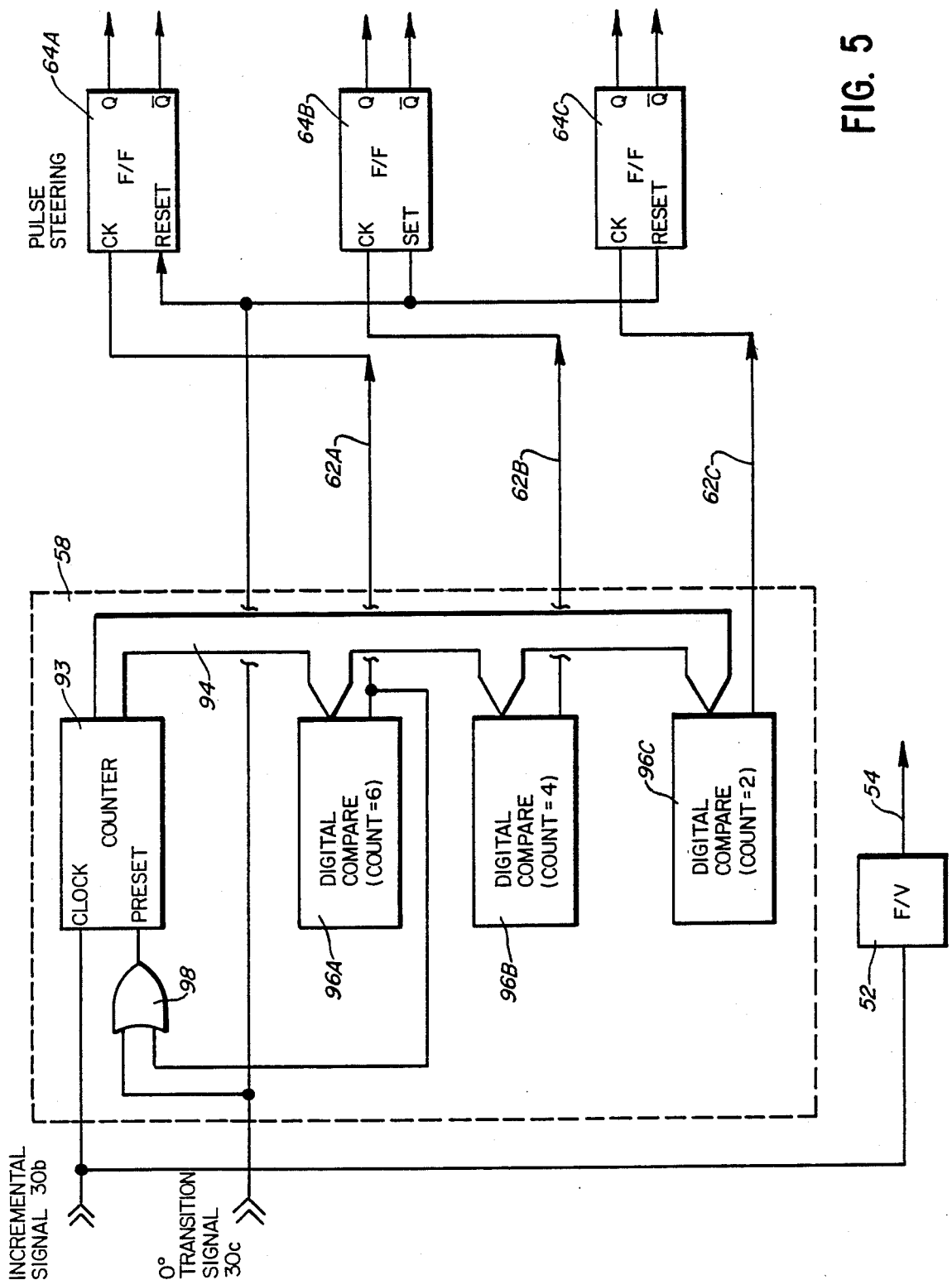
FIG. 5 is a block diagram of the zero crossing detector and pulse steering circuits of FIG. 3.

The zero crossing detector 58 and pulse steering circuits 64 are illustrated in more detail in FIG. 5. Zero crossing detector 58 includes a counter 93 clocked by the incremental motor position signal 30b and having a digital output on bus 94. Digital comparators 96A, B and C are connected with bus 94 and have outputs 62A, B, C. The pulse steering circuits 64A, B, C are flip-flops with Q, $\overline{Q}$ outputs connected to the +, − reset circuits, respectively, 72 for ramp generators 66. The circuit shown is for a three phase, six pole motor in which 10° mechanical is equal to 30° electrical.

Counter 93 is preset by the zero transition signal 30c, as to an output of bus 94 of 000 or 111, for example. The 0° transition signal also conditions the flip-flops, resetting 64A, 64C and setting 64B. Thus, at 0° rotor position, the Q outputs of 64A, C and $\overline{Q}$ output of 64B are low and the $\overline{Q}$ outputs of 64A, C and Q output of 64B are high. The Q outputs control reset circuit 72A+, B+, C+ while the $\overline{Q}$ outputs control reset circuits 72A−, B−, C−.

At a count of two, representing 20° mechanical and 60° electrical, motor rotation, the output of comparator 96C on line 62C goes high, clocking flip-flop 64C causing the Q output to go high and the $\overline{Q}$ output to go low. This allows ramp generator 66C− to operate and resets ramp generator 66C+. At a count of four, 120° electrical rotation, pulse steering flip-flop 64B is clocked, the Q output goes low releasing the signal of ramp generator 66B+, and $\overline{Q}$ goes high resetting ramp generator 66B−. Similarly, at a count of six, 180° electrical rotation, the output of comparator 96A clocks flip-flop 64A releasing ramp generator 66A− and resetting ramp generator 66A+. The count of six output on line 62A is also connected through OR gate 98 with the preset terminal of counter 93, restarting the count from its preset condition. On counts of two, four and six the pulse steering flip-flops 64C, B, A, respectively, are clocked again reversing the conditions of the outputs and releasing or resetting the corresponding ramp generators. At the end of the third two, four, six count sequence, the 0° transition signal should occur simultaneously with the output of digital comparator 96A, presetting counter 92. Flip-flops 64A, C are reset and 64B is set by the 0° transition signal. If the operation of the counter or flip-flops has gotten out of its timed relationship with motor position, as from signal noise, the circuits are all properly set with each occurence of the 0° transition signal.

The conditioned phase advance command signal on the line 84 is also coupled to the noninverting input of a comparator 90. The inverting input of the comparator 90 is coupled to a reference signal source 92 generating a signal representing a minimum phase advance value at which motor output torque is zero. The conditioned phase advance command signal goes above this level if negative torque is desired and the output of comparator 90 goes high, causing the mode select logic circuit to switch to a brake mode of operation. In the brake mode of operation the three lower inverter switches A−, B− and C− are turned on simultaneously to provide the decelerating torque for the motor.

According to the present invention motor torque is controlled by the phase advance command signal which controls in time the switching of voltage across the stator windings to selectively counter the motor back EMF voltage.

Motor speed is preferably controlled by controlling the DC bus voltage of terminals 18, 20. The motor control is especially useful for a continuously operating motor which changes speed at a relatively low rate as compared with the start-stop operation of Peterson U.S. Pat. No. 4,546,293. A system with such a control is described in copending Dishner et al. application entitled "Speed Limited Compensated Constant Speed Drive", Ser. No. 138,344, filed Dec. 28, 1987 and assigned to the assignee of this application.

While the preferred embodiment is illustrated with reference to a three phase motor, the principles disclosed herein may be utilized in other than a three phase brushless DC motor.

By utilizing a position sensor for providing an incremental signal and an analog position signal, the motor controller according to the present invention provides high accuracy during normal operating speeds responsive to the incremental position sensor. This high accuracy is not needed during start-up, and accordingly the analog position sensor is utilized. The speed at which the change from start mode to run mode is made is determined according to the particular application.

I claim:

1. A control for a brushless DC motor driven by an inverter having a pair of complementary conducting switches coupled across a source of DC voltage, the motor including a permanent magnet rotor and a stator having a stator coil which is energized by said switches in accordance with a phase advance command signal to control motor torque, comprising:

a source for a phase advance command signal variable over a range;

means for generating a ramp signal for each switch which increases over said range wherein the starting point of the ramp corresponds to a rotor position representing a maximum desired phase advance; and means coupled to said command signal source and said ramp signal generating means for comparing said phase advance command signal and each said ramp signal for developing switching signals to drive said switches to produce a desired motor torque.

2. The control of claim 1 wherein said ramp signal has a slope corresponding to rotor speed.

3. The control of claim 1 wherein said ramp signal generating means comprises a ramp generator and a reset circuit providing a resettable ramp signal having alternate ramp and hold portions.

4. The control of claim 3 wherein said reset circuit causes the transition from the hold portion to the ramp portion of the resettable ramp signal to occur at a rotational position of the rotor representing a maximum desired phase advance.

5. The control of claim 1 wherein said comparing means comprises a comparator having one input coupled to said command signal source and another input coupled to said ramp signal generating means.

6. A torque control for a permanent magnet brushless DC motor driven by an inverter having a pair of complementary conducting switches coupled across the source of DC voltage, the motor including a permanent magnet rotor and a stator having a coil which is energized by said switches comprising:
   first means for generating a signal representing absolute rotor position;
   second means for generating a periodic signal representing incremental rotor position;
   third means for generating a phase advance command signal;
   a start circuit coupled to said first means, including stored switch patterns for developing switch drive signals in accordance with rotor position in a start mode; and
   means coupled to the second means for developing a periodic sawtooth signal for each switch;
   a run circuit including means for comparing said phase advance command signal and each of said periodic sawtooth signals for developing switching signals to drive said switches produce a desired motor torque in a run mode; and
   means for selecting the mode of operation of said control to operate said inverter switches in accordance with either said start circuit or said run circuit.

7. The control of claim 6 wherein said sawtooth signal includes a ramp portion having a starting point corresponding to a maximum desired phased advance.

8. The control of claim 7 wherein said sawtooth signal ramp portion has a slope corresponding to a rotor speed.

9. The control of claim 6 wherein said developing means includes a ramp generator and a reset circuit providing said sawtooth signal having alternate ramp and reset portions.

10. The control of claim 9 wherein said reset circuit is operable to cause transition from the hold portion to the ramp portion of the sawtooth signal to occur at a rotational position representing a maximum desired phase advance.

11. The control of claim 6 further comprising an operational amplifier having one input coupled to said sawtooth signal and another input coupled to said third means.

12. The control of claim 6 wherein said selecting means includes means for developing a signal representing rotor speed and means for comparing said rotor speed signal to a preselected speed for switching from said start mode to said run mode.

13. The control of claim 6 further comprising means for comparing said phase advance command signal with a signal representing a minimum phase advance level, and means responsive to said comparing means for operating said control in a braking mode.

14. A torque control for a brushless DC motor driven by an inverter having a pair of complementary conducting switches coupled across a source of DC voltage, the motor including a permanent magnet rotor and a stator having a stator coil which is energized by said switches, comprising:
   means responsive to the mechanical position of the rotor of said motor corresponding to the maximum amount of phase advance required for generating ramp signals for each switch;
   a source of phase advance command; means for comparing the phase advance command with the ramp signals to establish the phase of the current in said stator coil and to control motor torque.

15. The torque control of claim 14 having a start mode with:
   means providing a signal representing the position of the rotor; and
   means responsive to the rotor position to establish a switching pattern for said switches.

16. The torque control of claim 14 having a brake mode with:
   means responsive to a minimum phase advance command to actuate a selected switch to brake the motor.

17. In a control for a brushless DC motor driven by an inverter having a pair of complementary conducting switches coupled across a source of DC voltage, the motor including a permanent magnet rotor and a stator having a stator coil, the control having a phase advance circuit in which a phase advance command is compared with a sawtooth signal synchronized with the position of said rotor, a sawtooth signal source for generating said sawtooth signal including:
   a ramp generator having as an input an analog voltage which is a function of motor speed, the ramp generator generating a ramp, wherein the ramp slope varies with motor speed.

* * * * *